United States Patent [19]

Hartz

[11] Patent Number: 4,912,292

[45] Date of Patent: Mar. 27, 1990

[54] Z-BAR FOR FORMING CAN MATERIAL

[75] Inventor: T. Jayes Hartz, Downers Grove, Ill.

[73] Assignee: Elpatronic AG, Zug, Switzerland

[21] Appl. No.: 274,935

[22] PCT Filed: Aug. 26, 1988

[86] PCT No.: PCT/EP88/00763

§ 371 Date: Nov. 1, 1988

§ 102(e) Date: Nov. 1, 1988

[51] Int. Cl.[4] .................... B23K 11/32; B23K 37/04
[52] U.S. Cl. ...................................... 219/64; 228/17.5
[58] Field of Search .......................... 219/64; 228/17.5

[56] References Cited

U.S. PATENT DOCUMENTS 4,540,879  9/1985  Haerther et al. .................... 219/64

FOREIGN PATENT DOCUMENTS 2006659  5/1979  United Kingdom .
2156725  10/1985  United Kingdom .
WO78/00015  12/1978  World Int. Prop. O. .

Primary Examiner—Clifford C. Shaw
Attorney, Agent, or Firm—McCormick, Paulding & Huber

[57] ABSTRACT

An alignment tool, such as a Z-bar or a crossover Z-bar, for use in a welding device for seam welding cylindrical can bodies, has the improvement that the guide grooves for the Z-bar are formed in inserts mounted in the body so that at least the material of the body can be non-conductive and non-magnetic and the insert can be non-magnetic to prevent or lessen the chances of sparking in the welding machine. In one embodiment, the inlet end is provided with an inlet body formed of an impact resistant, wear-resistant material, such as a tungsten carbide, while the inserts in which the guide grooves are formed is formed of a ceramic material that is both non-magnetic and non-conductive.

15 Claims, 3 Drawing Sheets

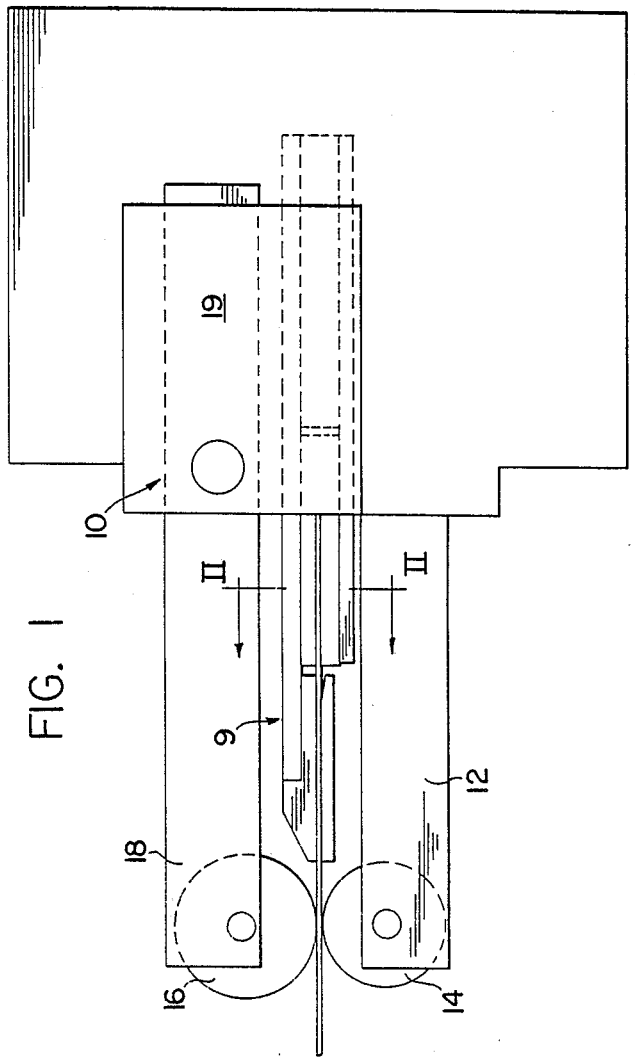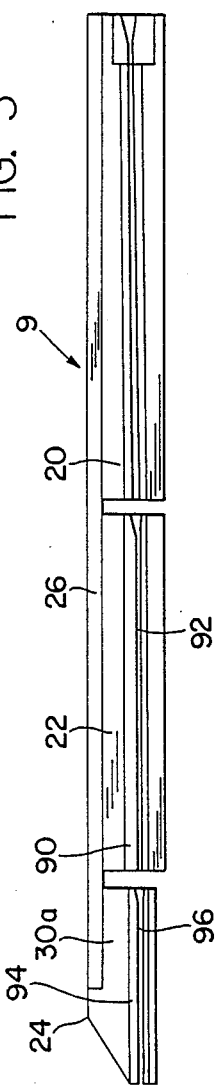

Z-BAR FOR FORMING CAN MATERIAL

The present invention is directed to an alignment tool for a metal cylindrical can welding machine, wherein a flat metal can body blank is formed into a cylinder and then seam welded. The tool has at least one elongated bar component having two longitudinally extending opposite sides, each side having a longitudinally extending groove and the grooves guide the edges of the can blank into a position for seam welding by electrical seam welding rollers.

In forming metal cylindrical cans out of sheet metal blanks, known machines use a plurality of rollers to roll a flat blank into a cylindrical form with overlapping edges, which are subsequently seam welded, to complete the cylindrical can. In order to guide the two edges during the final movement into the welding rollers, the machines use a guiding component, which is commonly referred to as a Z-bar or Z-rail, and which has two opposite sides with grooves which guide the edges from a spaced apart position into a closely aligned, slightly overlapping position for welding. These Z-bars can be sub-divided into sections. An example of these known devices is disclosed in U.S. Pat. No. 4,214,140, whose disclosure is incoporated by reference thereto.

Since the electrical welding is a resistant welding type arrangement, problems can occur because of arcing between the parts, the sections of the Z-bars and other equipment. This sparking will create dirt or bits of metal which can contaminate surfaces of the products being produced, cause undue wear of bearings of various guide bushings for rollers that are used in forming the can blanks and create undue wear in the Z-bar itself.

Due to the fact that the two edges of the blank entering into the guide tool, which comprises a plurality of Z-bar portions, may have the edges originally spaced apart but moving towards a closely adjacent overlapping position, it is desirable to form these Z-bar portions in segments or sections. Thus, it is common for the guiding tool to include a crossover bar in which the edges move from being spaced apart a substantial distance to a close overlapping position, followed by a Z-bar section, where the edges continue to be held in the desired position. The guiding tool, finally, has a head piece, which holds the edges just prior to entering the welding rollers.

To overcome problems with arcing, it has been proposed, in U.S. Pat. No. 4,540,879, to construct each of the Z-bars in two or three component parts, with the center component which has the grooves for guiding the edges of the blank being formed of a tungsten carbide material. This provides a guiding tool which is non-arcing and can be electrically isolated. This guiding tool will eliminate some of the problem with sparking.

SUMMARY OF THE INVENTION

The object of the present invention is to provide a Z-bar which is, in most part, electrically and magnetically inert and is less expensive to manufacture than the full carbide Z-bars.

In order to accomplish these goals, the present, invention is directed to an improvement in an alignment tool for a metal cylindrical can welding machine, wherein flat metal can body blanks are formed into cylindrical blanks with overlapping edges, which are seam welded, the tool having at least one elongated bar component having two longitudinally extending opposite sides, each side having a longitudinally extending groove, said grooves guiding the edges of the can blanks into a position for the seam welding. The improvement comprises the bar component having elongated slots in each opposite side, an insert being secured in each of the slots and being of a material different than the material of the bar, said longitudinally extending grooves being provided in said inserts.

Since the opening or inlet mouth of the first component of the tool, such as the crossover Z-bar, has a large offset between the two edges and an enlarged throat portion, it is desirable to use an insert or entry block at the inlet of the crossover bar, which is formed of a material, such as tungsten carbide, that can absorb shocks of the body blank striking at a normal welding speed, is wear resistant, and can be readily fabricated with complex shapes required for proper entry leads. By keeping this entry block at the entry or inlet and reasonably small, the cost for manufacturing is reduced and the cost of replacing this carbide block is greatly reduced. The tungsten carbide block should be non-magnetic. The inserts along the slots are preferably formed from a material that is machinable, is abrasion resistant, and is non-magnetic. A ceramic material, such as silicon nitride, aluminum oxide or another abrasion resistant, non-conductive material, is easily machined in this area because the grooves being machined have a relatively simple goemetry as compared to the inlet throat of the grooves. These ceramic strips are non-magnetic and also non-conductive. In addition, the strips can be divided in the longitudinal direction to facilitate fabrication and to reduce the cost of fabricating the device. It is noted that, while the ceramic strips do not have the impact resistance of the tungsten carbide insert, they still have a good wear resistance.

The main component is preferably formed of a material which is both electrically non-conductive and non-magnetic. Ideally, this is a fiber glass reinforced epoxy material, which should have sufficient strength and rigidity to funtion structurally. However, the conventional nihard bodies could also be used if desired.

Other advantages and features of the invention will be readily apparant from the following description of the preferred embodiment, the drawings and claims.

BRIEF DESCRIPTION OF THE DRAWINGS

FIG. 1 is a schematic view of a section of the resistant seam welding machine embodying the improvements of the present invention;

FIG. 3 is a side view of the guiding tool having three positions, as illustrated in FIG. 1, with portions of the machine removed for purposes of illustration;

DESCRIPTION OF THE PREFERRED EMBODIMENTS

Figure 8:
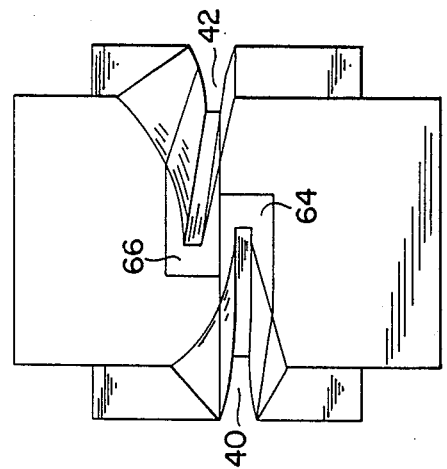
FIG. 8 is a right-hand end view of the crossover bar of FIG. 4.

The principles of the present invention are particularly useful when incorporated in a guiding element or alignment tool, generally indicated at 9 for a resistant welding machine, generally indicated at 10. The resistant welding machine 10 is used in connection with welding seams on the bodies of metal cans during the forming process. The machine has a lower support arm 12, which carries an electrode or welding roller 14, which is opposed by a second electrode or welding roller 16 carried on a second support arm 18. Blanks of the can body are rolled into a cylindrical form within an area designated at 19 and are continuously fed along the guiding element 9, which is formed of one or more Z-bars arranged in a following order, and which guides the edges of the blank towards the rollers 14 and 16, which perform the welding operation.

Figure 2:
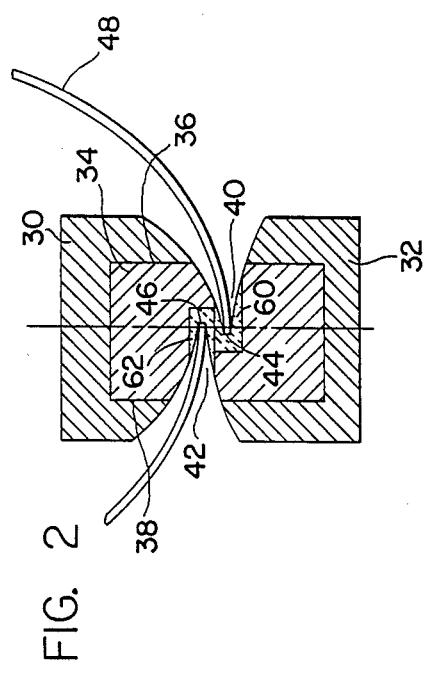
FIG. 2 is a partial cross sectional view taken along approximately the line II—II of FIG. 1.
Figure 7:
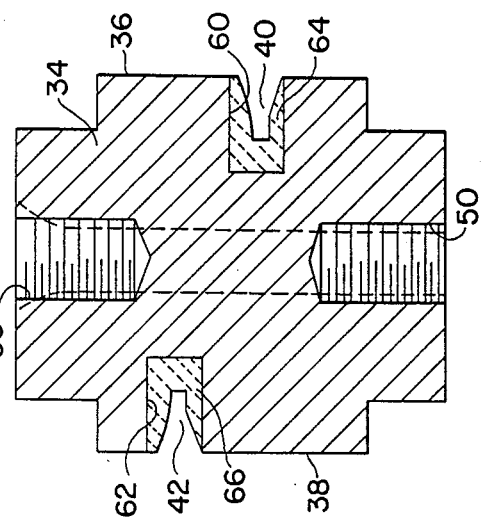
FIG. 7 is a cross sectional view taken along the lines VII—VII of FIG. 4.
Figure 6:
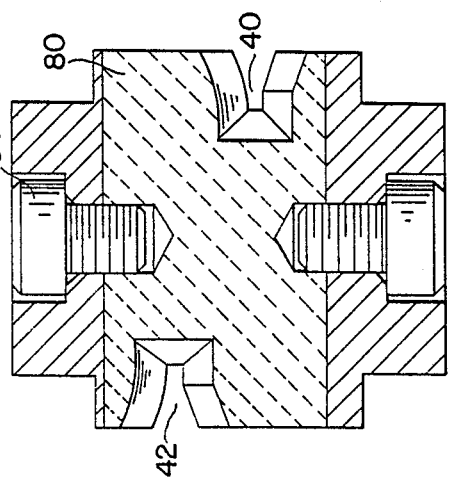
FIG. 6 is a cross sectional view taken along the lines VI—VI of FIG. 4.

The guiding element 9, as illustrated in FIG. 3, is made up of a number of portions or components, which includes a crossover Z-bar 20, a regular Z-bar component 22 and a head piece 24. As illustrated, these three portions, 20, 22 and 24 are secured rigidly together by a carrier member, such as 26. Each of the components 20 and 22, as best illustrated in FIG. 2, consists of an upper cap member, such as 30, a lower cap member 32 and a central or center body portion 34. The head piece has a central body 94 and upper cap member 30a (FIG. 3). As illustrated in FIG. 2, the central body portion 34 has opposite sides 36 and 38 which have grooves 40 and 42, respectively. The grooves 40 and 42 receive edges 44 and 46 of a cylindrical can body 48 and guide these edges 40 and 46 into the desired overlapping position. As the can body is received by the guide element 9, particularly the crossover Z-bar 20, as best illustrated in FIG. 6, the edges are spaced apart a substantial distance in both a horizontal and vertical direction. As the can body proceeds through the alignment tool 9, the edges are moved towards each other so that, as illustrated in FIG. 8 and also FIG. 2, the edges begin to become overlapped and the spacing between the two in a vertical direction, such as along the line 50 of FIG. 2, decreases. By the time the body has entered into the head piece 24, the edges 44 and 46 have been moved into the desired amount of overlap so that, as they pass through the welding rollers 14 and 16 the seam is formed.

Figure 4:
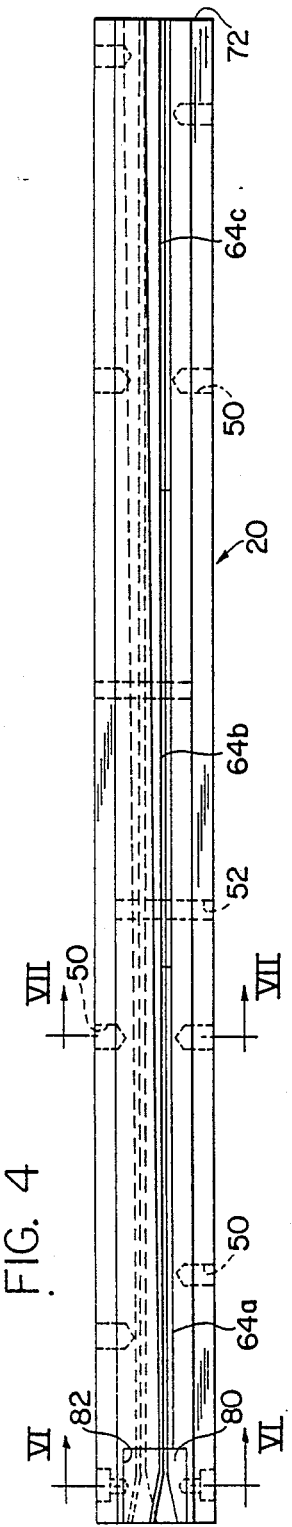
FIG. 4 is a side view of the crossover Z-bar of the guiding tool of the present invention.
Figure 5:
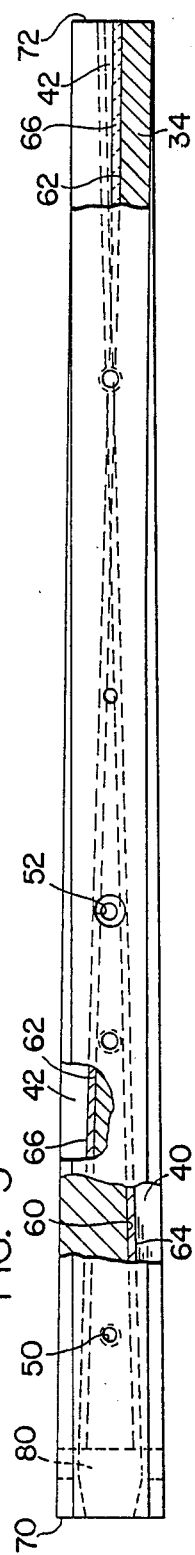
FIG. 5 is a plan view of the crossover Z-bar of FIG. 4, with portions broken away for puposes of illustration.

Each of the central portions 34, such as illustrated by the center member for the crossover Z-bar 20 of FIGS. 4 and 5, are provided with threaded blind holes 50, which are used for securing the bar assembly to another component of the machine. The center member may also have holes or bores 52 that extend therethrough.

The arrangement that has been described up to now is conventional and similar to that disclosed in the above-mentioned U.S. Pat. No. 4,540,879, whose disclosure is incorporated by reference thereto. The improvement of the present invention is the provision of slots 60 and 62 extending inwardly from the sides 36 and 38, respectively. Inserts 64 and 66 are secured in these slots 60 and 62 and the guide grooves 40 and 42 are formed in these inserts. As can be seen from FIG. 5, the groove 62 extends deeper into the center member 34 of the crossover Z-bar 20 as one proceeds from the inlet or entry end 70 towards the discharge or outlet end 72. Also, as illustrated in FIG. 4, each of the inserts, such as the insert 60, has the distance of offset from the center axis decrease as the distance from the inlet end 70 increases. Thus, the vertical spacing of the edges becomes less as the horizontal spacing is decreased and moves towards the overlapped position.

At the entry end 70, the crossover Z-bar is provided with an insert block or body 80, best illustrated in FIGS. 4 and 6. The insert body 80 is held in a recess 82 in the central member of the crossover Z-bar by threaded fasteners, such as socket head cap screws 84.

Due to the materials used for the inserts, such as 64 and 66, it is possible and desirable to form these in small strips that do not extend the full length of the component or member 20. Thus, the strip, such as 64, may be sub-divided into three or more sections, such as the sections 64a, 64b and 64c, which are joined end-to-end at joints, such as 65.

The central body of each of the components, such as 20, 22 and 24 is preferably formed of materials which are non-conductive and non-magnetic. These provide the advantage of reducing sparking as the blank moves between the elements to the welding rollers, which provides the advantage of reduced wear of the guides, as well as reduced wear of other moving parts in the general vicinity of the machine. By being produced of non-magnetic material, there is no creation of magnetic forces to oppose the guiding of the edges in the grooves 40 and 42. In fact, the use of non-magnetic Z-bars may cause the can edges to roll tighter into the grooves, while a magnetic Z-bar may cause forces to oppose the tighter movement into the grooves.

The central portion or body 34 is preferably formed of a non-magnetic and non-conductive material. Fiber glass reinforced epoxy has been found suitable for this portion. At the entry end 70, the insert or body 80, which is also non-magnetic and is, preferably, a tungsten carbide wear block, which, as mentioned before, is mechanically fastened in the recess 82 by the threaded fasteners 84. The inserts, such as 64 and 66, are preferably of a ceramic material, which can be a silicon nitride, aluminum oxide or other abrasion resistant, non-conductive material. These inserts, such as 64, whether they have a length equal to the entire length of the component or are divided into sections that are joined together as mentioned above, are fastened in the slots by an adhesive.

The tungsten carbide entry block 80 is used instead of the above-mentioned ceramic strips, because it is impact resistant, wear-resistant and can be easily machined, such as by an erosion process, such as an EDM process, to develop the desired complex shapes for the entry lead. Even though the tungsten carbide may be electrically conductive, it is isolated from the frame of the welder by the surrounding epoxy material of the Z-bar body.

The ceramic strips, such as 64, typically posess relatively low impact strength, but have excellent wear-resistance and are both electrically and magnetically inert. Since the material is non-magnetic and non-conductive, it is not exposed to spark erosion and, therefore, the useful life of this portion is greatly increased. The ceramic components, after being inserted in the slots, are then fabricated or provided with the guide grooves by conventional grinding equipment only and can be ground after assembly in the Z-bar body to a very precise tolerance. It is noted that the fabrication of ceramic complex shapes to precise tolerances, such as the lead-in portion formed in the tungsten carbide block 80, would be a relatively expensive operation.

The Z-bar or second bar component, such as 22, has a body portion 90 with slots for receiving inserts, such as 92. In this arrangement, the body portion 90 can be formed of a fiber glass reinforced epoxy and the inserts can be tungsten carbide, in which the guide grooves are then formed. The head piece 24 can also have a body 94, which has slots receiving inserts 96. Again, the body 94 is of a fiber glass reinforced epoxy and the inserts are of tungsten carbide. Since the body portions, such as 90 and 94, are formed of an epoxy material or other non-conductive and non-magnetic material, the carbide strips 92 and 96, even though electrically conductive, are insulated from any circuit and, thus, will not produce any sparking or minimal sparking. It should be realized that the use of the fiber glass reinforcements for the bodies, such as 90 and 94, is an example of the preferred embodiment, however, other materials, which are both non-magnetic and non-conductive, which have adequate strength, can be utilized.

I claim:

1. In an alignment tool for a metal cylindrical can welding machine, wherein flat metal can body blanks are formed into cylinders and have their overlapping edges seam welded together, said tool having at least one elongated bar component having two longitudinally extending opposite sides., each side having a longitudinally extending groove, said grooves receiving edges of the can blank for guiding the edges into a position for the seam welding, the improvements comprising the bar component having elongated slots in each opposite side, an insert of a material being different from said bar being secured in each slot and the longitudinally extending grooves being provided in said inserts.

2. In an alignment tool according to claim 1, wherein the bar component is composed of a non-conductive, non-magnetic material, and each of the inserts is at least of a material which is non-magnetic.

3. In an alignment tool according to claim 2, wherein the body of the bar component is composed of a fiber glass reinforced epoxy and the inserts are of tungsten carbide.

4. In an alignment tool according to claim 2, wherein the inserts are formed of cermic strips.

5. In an alignment tool according to claim 4, wherein each of the ceramic strips is formed in sections.

6. In an alignment tool according to claim 1, wherein an entry end of the bar component has a recess receiving a non-magnetic, impact resistant, wear-resistant entry block.

7. In an alignment tool according to claim 6, wherein the non-magnetic impact resistant entry block is formed of non-magnetic tungsten carbide and the inserts are formed of a non-conductive and non-magnetic ceramic material.

8. In an alignment tool according to claim 7, wherein the bar component is formed of a glass fiber reinforced epoxy.

9. In an alignment tool for a metal cylindrical can welding machine wherein flat metal can body blanks are formed into cylinders and have their overlapping edges seam welded together, said tool having a crossover bar component having two longitudinally extending opposite sides and a second bar component having two longitudinally extending opposite sides, each of the opposite sides having a longitudinally extending groove, said crossover bar component having an entry end position to receive a can being discharged at the exit end of the crossover bar component, said grooves receiving edges of the can blanks and guiding the edges into a position for seam welding as the can blank moves from the entry end of the crossover bar to the exit end of the second component, the improvements comprising the crossover bar component and the second component having elongated slots in the opposite sides, inserts of a material different from the material of the respective bar component being secured in each slot and the longitudinally extending grooves being provided in said inserts.

10. In an alignment tool according to claim 9, wherein the crossover bar component at the entry end has a transverse recess receiving an entry block of a non-magnetic, impact resistant, wear-resistant material and the longitudinally extending grooves of the crossover bar component having an entry portion formed in entry block.

11. In an alignment tool according to claim 10, wherein the crossover bar component and the second component are each formed of a non-magnetic, non-conductive material and the strips being formed of a non-magnetic material.

12. In an alignment tool according to claim 11, wherein the strips of the crossover bar component are of a material which is non-conducting and non-magnetic and the strips of the second bar component and the entry block are tungsten carbide.

13. In an alignment tool according to claim 12, wherein each of the strips of the crossover bar component is of a ceramic material.

14. In an alignment tool according to claim 13, wherein each of the ceramic strips are formed of sections joined together.

15. In an alignment tool according to claim 12, wherein the crossover bar component and second bar component are formed of fiber glass reinforced epoxy.

* * * * *

UNITED STATES PATENT AND TRADEMARK OFFICE
CERTIFICATE OF CORRECTION

PATENT NO. : 4,912,292

DATED : March 27, 1990

INVENTOR(S) : Hartz

It is certified that error appears in the above-identified patent and that said Letters Patent is hereby corrected as shown below:

Column 6

Claim 9

Line 15, after "end" please insert--and an exit end, said second bar component having an entry end--.

Signed and Sealed this

Sixth Day of October, 1992

Attest:

DOUGLAS B. COMER

Attesting Officer

Acting Commissioner of Patents and Trademarks